(12) United States Patent
Berstis

(10) Patent No.: US 7,971,196 B2
(45) Date of Patent: Jun. 28, 2011

(54) EXTRACTING INFORMATION FROM SOFTWARE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/002,409

(22) Filed: Dec. 17, 2007

(65) Prior Publication Data
US 2008/0141245 A1   Jun. 12, 2008

Related U.S. Application Data

(63) Continuation of application No. 09/970,655, filed on Oct. 4, 2001, now Pat. No. 7,392,517.

(51) Int. Cl.
*G06F 9/45* (2006.01)

(52) U.S. Cl. ......... 717/140; 717/142; 717/143; 717/162

(58) Field of Classification Search ........................ None
See application file for complete search history.

*Primary Examiner* — Chuck O Kendall
(74) *Attorney, Agent, or Firm* — David A. Mums, Jr.; Mark Vallone; Robert V. Wilder

(57) ABSTRACT

A method and implementing computer system are provided in which selected information is embedded within computer program structures without requiring separate bit strings. In an exemplary embodiment, the embedded selected information includes an identification of a licensed user together with a serial number of the associated licensed program. That information is converted into a binary representation, and a transfer function is used to embed the binary representation into the structure of the licensed program. In the example, when a licensed program is compiled, linked and downloaded over an interconnection network, the order or sequence of the modules of the licensed program is arranged in a manner to correspond to the embedded selected information. The embedded information can then be extracted from the program by analysis of the organization of the modules comprising the program.

9 Claims, 7 Drawing Sheets

EXTRACTING INFORMATION FROM SOFTWARE

RELATED APPLICATIONS

The present application is a Continuation Application from application Ser. No. 09/970,655, which was filed on Oct. 4, 2001 now U.S. Pat. No. 7,392,517.

FIELD OF THE INVENTION

The present invention relates generally to information processing systems and more particularly to a methodology and implementation for processing information within software programs or data.

BACKGROUND OF THE INVENTION

Software programs, for use on computers and computer systems, are licensed and distributed to users in many forms. Unfortunately, many of the licensed programs are copied and/or further distributed in violation of the terms of the license agreement. Thus, there has been a continuing effort to implement a validating method for associating particular licensed programs with the purchaser of such programs so that unauthorized copies of the licensed program can be identified.

Most of the currently available software validating systems which have been implemented have not been totally effective. For example, when separate code sections or bit fields that identify particular licensed programs are included with the functional software code, the program-identifying code can be readily found and erased or deleted so that particular licensed programs cannot be traced and unauthorized copies cannot be detected.

With the increased use of Internet commerce, and the increasing licensing and downloading of software packages over the Internet, it is essential to have an improved method for identifying software packages and associating particular software packages with individual licensees or users in a manner that is more effective and more difficult to circumvent by unauthorized users.

In the past, identification keys, holograms, ID bit fields and other methods have been used to identify legitimate copies of licensed software packages. However, where such methods require physical objects, such as hard copy license agreements and/or serial numbers stamped on media carriers, they are not desirable for use, especially for programs that are downloaded from sites on the World Wide Web over the Internet.

Thus, there is a need for an improved system for identifying licensed software programs, especially where such programs are transferred over a network to licensed users.

SUMMARY OF THE INVENTION

A method and implementing computer system are provided in which selected information is extracted from computer program structures. The selected information can be extracted from analysis of the program structure and used to re-create selected information which has been embedded within the organization of the computer program. In an exemplary embodiment, the embedded selected information includes an identification of a licensed user together with a serial number of the associated licensed program. The selected information is extracted by analyzing the organization of a program and determining, for example, a sequence in which program modules are coupled together. The determined sequence is used to re-create the embedded information. In an exemplary embodiment, a transfer function is used to create a binary stream from the module sequence and the binary stream is representative of the embedded information.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which may include a website server and a user workstation or personal computer. Both the website server and the user workstation include code to implement the methodology hereinafter disclosed. In general, an implementing computer system may include a plurality of processors in a multi-bus system in a network of similar systems. However, since the server and workstation or computer system implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
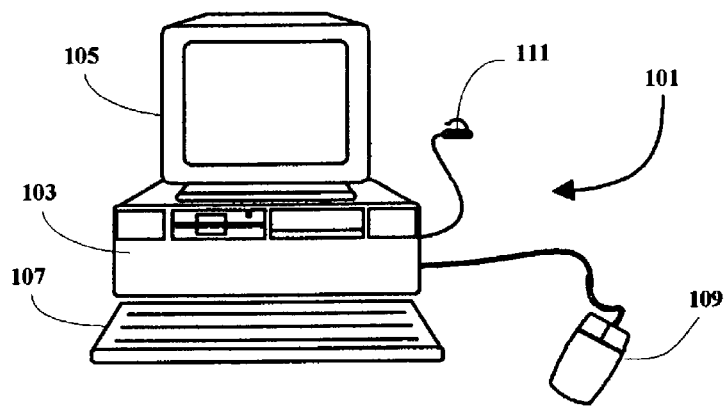
FIG. 1 is a diagram of a computer system in which the present invention may be implemented.

In FIG. 1, the user terminal computer system includes an electronics enclosure 103 which is typically arranged for housing one or more CPUs (central processing units) along with other component devices and subsystems of the computer system 101. Although a "desktop" system is shown in the example, it is understood that the present invention may also be implemented in smaller portable personal computer system devices including mobile and cellular hand-held devices. The computer system 101 also includes a display device 105, a keyboard 107 and a mouse or pointing device 109, which are all interconnected within the illustrated computer system. The present invention may also be implemented in a laptop computer having a display device other than a CRT (cathode ray tube). Also shown in FIG. 1 is a connector 111 which is arranged for connecting a modem within the computer system to a communication line such as a telephone line in the present example. The present invention may also be implemented in a mobile or cellular system without the connector 111.

Figure 2:
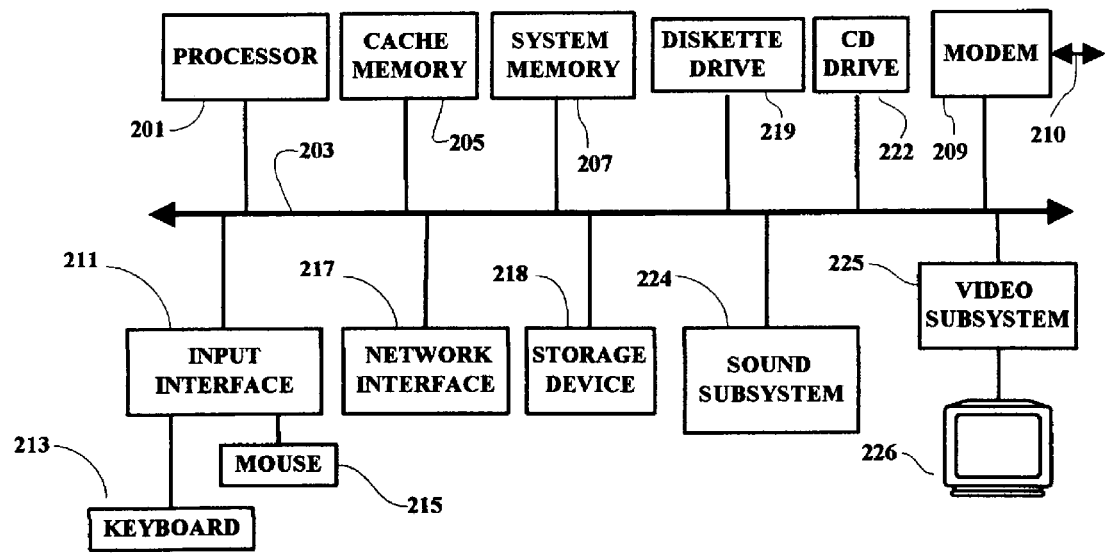
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217, a diskette drive unit 219 and a CD drive device 222. A video subsystem 225, which may include a graphics subsystem, is connected to a display device 226. As hereinbefore noted, the display device may be of any known technology for presenting display screens to a user. A storage device 218, such as a hard drive unit, is also coupled to the bus 203. The diskette drive unit 219 and CD drive 222 provide a means by which individual diskette or CD programs may be loaded on to the hard drive, or accessed directly, for selective execution by the computer system 101. As is well known, program diskettes containing application programs represented by indicia on the diskette or CD programs in system memory, or downloaded or acquired through a local network or through the world wide web may be read to provide program signals. Such program signals are selectively effective to cause the computer system to present displays on the screen of a display device and respond to user inputs in accordance with the functional flow of the application program being executed. Each screen typically has one or more selections for the user to make in navigating through the program. In general, a user will make selections from a display screen using the keyboard 213 or the mouse or pointer device 215. In an Internet browser program, the selections made by the user will determine "where" the user "goes", i.e. to what "site" or "webpage", and also, in some cases, the communications link or the path taken to get to the site selected.

Figure 3:
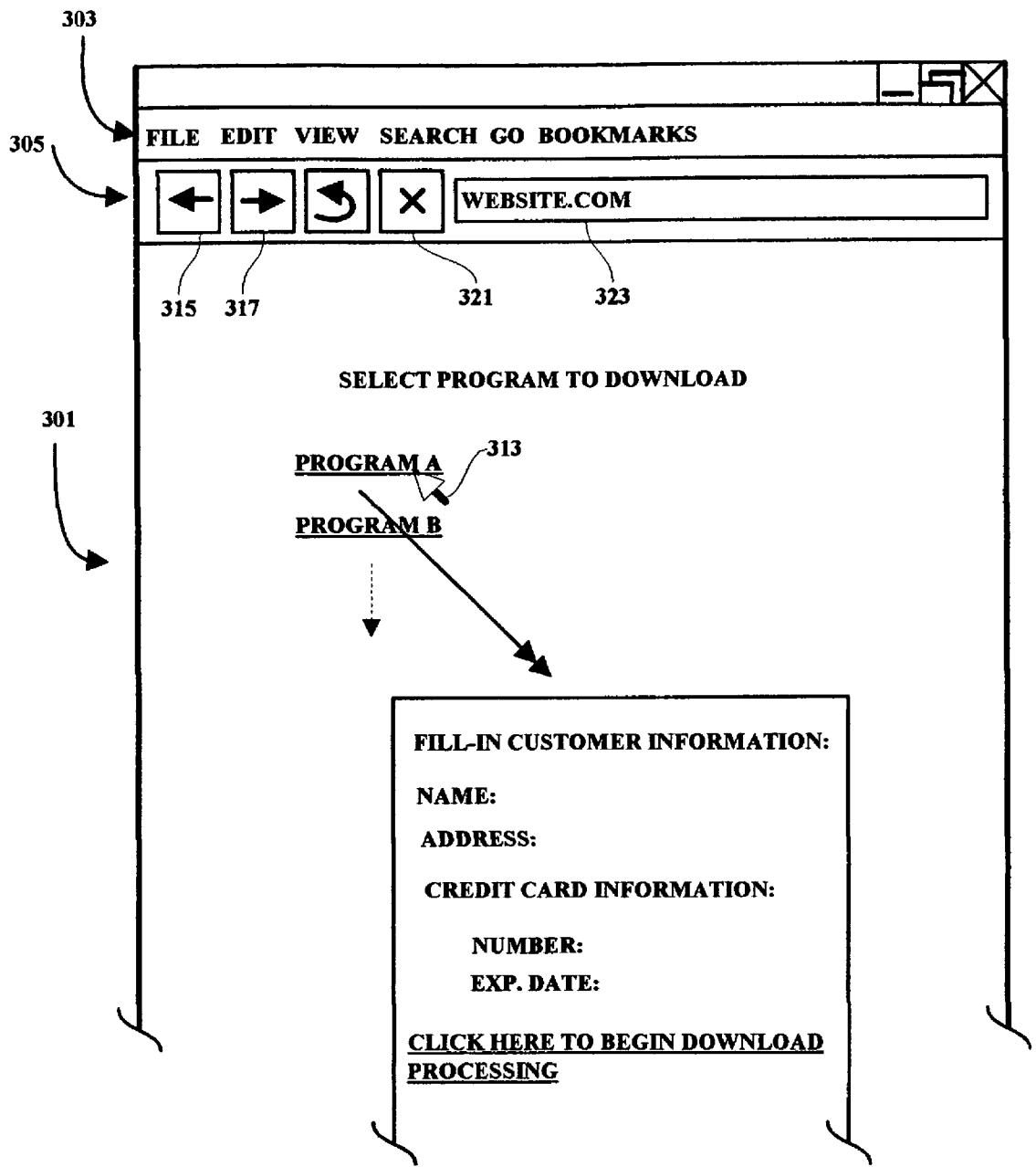
FIG. 3 is an illustration of an exemplary display screen of a website page from which licensed programs may be selected and downloaded to a user terminal.

As shown in FIG. 3, an exemplary browser screen 301 includes a menu bar 303 which displays several different modes which the user may select such as "FILE", "EDIT", etc. Another selection menu 305 is displayed to help a user quickly move through documents, websites, or pages in a network application. An address or "location" section 323 enables a user to key-in, and also displays the name of a website address of a site to be, or being, visited. Other quick access buttons may be implemented on the screen for quick access to other selected network services and/or network functions. In general, any of the illustrated items may be selected through a "point and click" methodology associated with the mouse device 215, and a cursor or pointer indicium visible on the display screen. For example, a download of data from a remote site may be immediately terminated during the transmission by pointing to the "X" button and clicking on a designated mouse button. Similarly, the "Back" and "Forward" arrow buttons 315 and 317 may be used to return to the last screen display or go forward to the next screen display, respectively.

In the FIG. 3 example, the "location" or "URL (uniform resource locator) designation is illustrated as "WEBSITE-.COM". The exemplary webpage 301 shows a selection of software packages which are available for license and download from the website. A user is enabled to indicate which software package the user wishes to license by pointing to the selected software package, for example "PROGRAM A", with the pointer 313 and clicking the appropriate mouse button. At that time, the user will be presented with requests for user information in order to complete the license transaction and download the selected program from the website to the user terminal.

Figure 4:
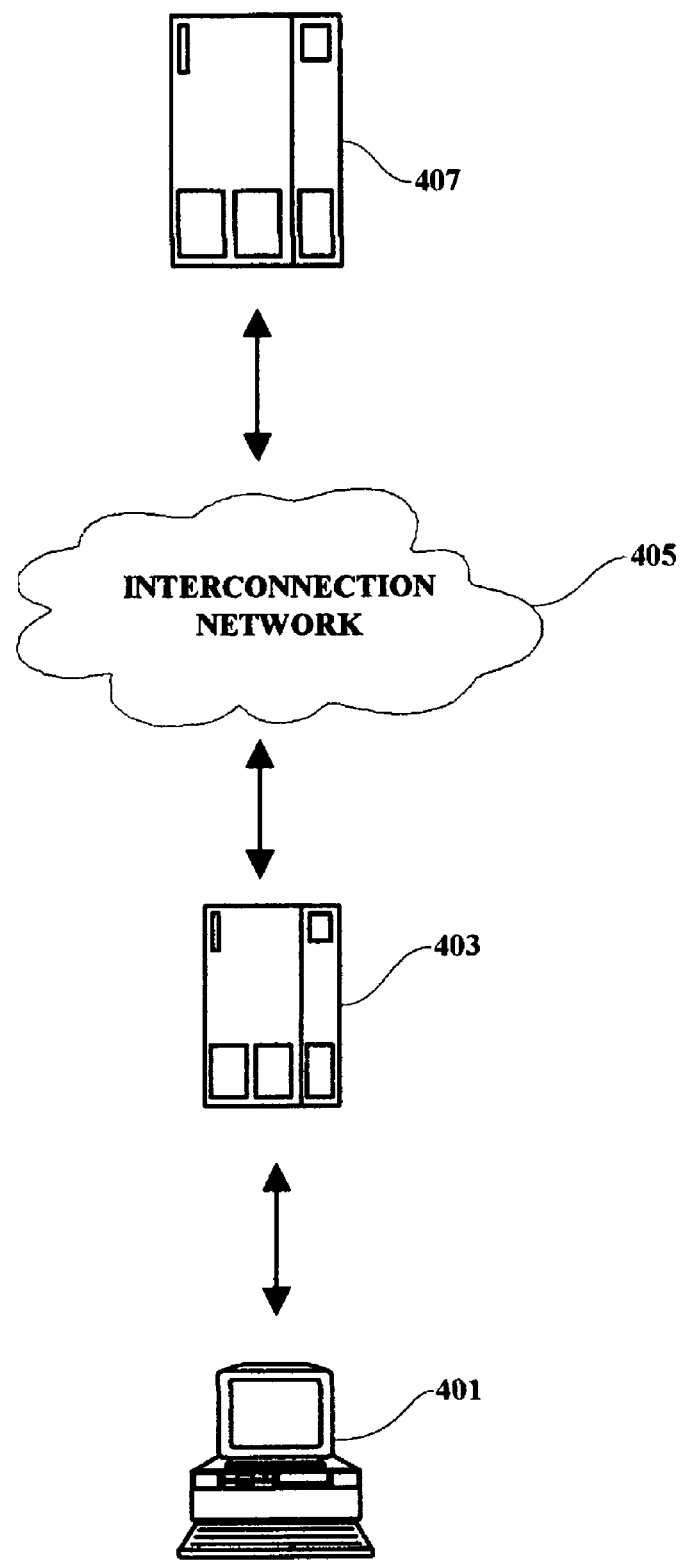
FIG. 4 is illustration of a user terminal connection to a website from which a licensed program may be downloaded.

As shown in FIG. 4, when a so-called "browser" program is running on a user computer system 401, the browser is selectively operable to connect through an Internet Service Provider (ISP) 403, and an interconnection network 405 such as the Internet, to a selected website server 407. As noted above, the website server includes several software packages which may be licensed to a user and downloaded to the user terminal 401. In obtaining a license for a software package, a user will provide the user's name and other requested information such as credit card information. The user will also indicate acceptance of the terms of a license agreement before a requested software program is downloaded to the user.

For purposes of this disclosure, the terms software package, code, downloaded code, and other similar terms refer to, but are not limited to, a digital string of bits which may be an executable program or a static literary work such as an encyclopedia, dictionary, novel, news article, music, pictures, movies, speech recordings and other data collections in any number of formats. Typically, any such digital data string is composed of subcomponents which are generally referred to herein as modules. Such digital data has the flexibility to tolerate different orderings of its modules. The ordering of those modules is what is used to encode the additional data within the overall "software package".

Prior to downloading the requested software package, a website acquires certain transaction information, which may include user-identifying information and also program-identifying information, and includes that transaction information in the package that is downloaded to the user. As hereinbefore noted, instead of including user information in a separate code segment of the download, the transaction information is included in the structure or organization of the downloaded code or data. Every software package consists of code blocks, data areas, subroutines, methods and other such subcomponents. After a requesting user has furnished the requested information and agreed to the terms of a license agreement, the website will compile and link the various components of the software package together to form an executable module which is then downloaded to the user. Normally, when the various components of the software package are linked together to form the executable module, the exact order of placement or sequence of the components is usually not critical for the proper execution of the software. In accordance with the present invention however, the ordering and/or sequence of those components and/or sub-components is used to encode selected transaction information such that this encoded information can later be extracted from the licensed software and copies of the licensed software in the downloaded executable form. Thus, the ordering or sequence of the software package components is used to encode a serial number for the licensed software package as well as other useful information. The embedded information can be checked at a later time to determine if the software or data have been tampered with or if the usage pattern leads to suspicions about illegal copying. The embedded information can then be used to track down the source of the illegal copies.

For purposes of explanation, a "module" as used herein is a portion of the total software or data which can be moved to different positions within the overall software package with possible minor adjustments in pointer values which would not substantially change the size of the overall package. For example, a module could be a subroutine or object method. It would not matter (except in very unusual circumstances) whether two subroutines were to be ordered differently in the resulting package. Any call instructions would simply have their addressing pointers adjusted to the new positions of the subroutines either by linkage editor or even the compiler. Similarly, various data areas or data areas containing constraints can be recorded in various ways. When the data areas are not parts of larger structures where order may be important, the data items are usually addressed by pointers or offsets which can be suitably adjusted at compile or link time without ill effects. In some architectures, some offsets or pointers may have variable sizes so that if the item being pointed to is located a larger distance from the reference, the pointer size may need to increase. Modules would be presumably chosen such as to minimize any effects such as these by making small local reorderings. Another approach is to reorder "code blocks". Code blocks are smaller sections of code generated by compilers which can be used as modules for the purposes of reordering, for example, such as those code blocks specified in the "if" statement's "then" clause or "else" clause. These clauses can be arranged in different orders with little ill effect.

Figure 5:
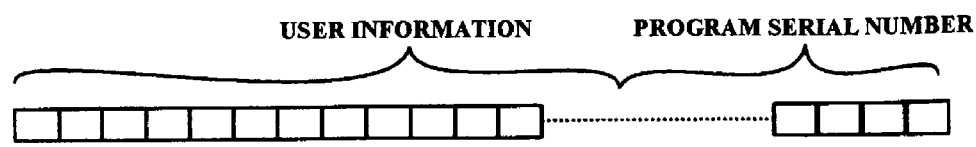
FIG. 5 is illustration showing an exemplary bit sequence which may be used to determine the module arrangement shown in FIG. 6.

As shown in FIG. 5, in encoding a user identity and a serial number for a licensed software package, each letter or number of the name and serial number is reduced to a binary representation and placed in a selected sequence to form a series of bytes, with each byte comprised of a series of bits in a bit sequence. For each bit, two unique submodules can be ordered in one of two ways in encoding that bit. Thus, for "n" bits, it is sufficient to use 2n subcomponents, with each pair ordered in a way that corresponds to its corresponding bit.

It is noted that there are many encoding methods possible other than the simple "2n" approach described here. If there are modules that can be arranged in arbitrary orders with respect to each other, then there are m! (m factorial) ways to arrange these modules. This means that m modules could be used to encode up to log to the base "2" of "m" factorial bits of information. The m! possible arrangements are simply numbered sequentially and the binary representation of a number for the given arrangement represents the log to the base "2" of "m" factorial bits of information being encoded. However, this requires a more complex transfer function than the 2n pairs encoding used in the present example.

In the illustrated example, the software package modules or submodules are identified in corresponding pairs of two modules, and the particular sequence in which any pair is linked will determine whether the corresponding bit in a bit sequence, is a logical "1" or a logical "0". In this manner, a bit sequence corresponding to selected transaction information (such as user name and program serial number) is used to encode the order in which sequential pairs of modules or submodules are ordered in an executable module which is to be downloaded to the user.

Figure 6:
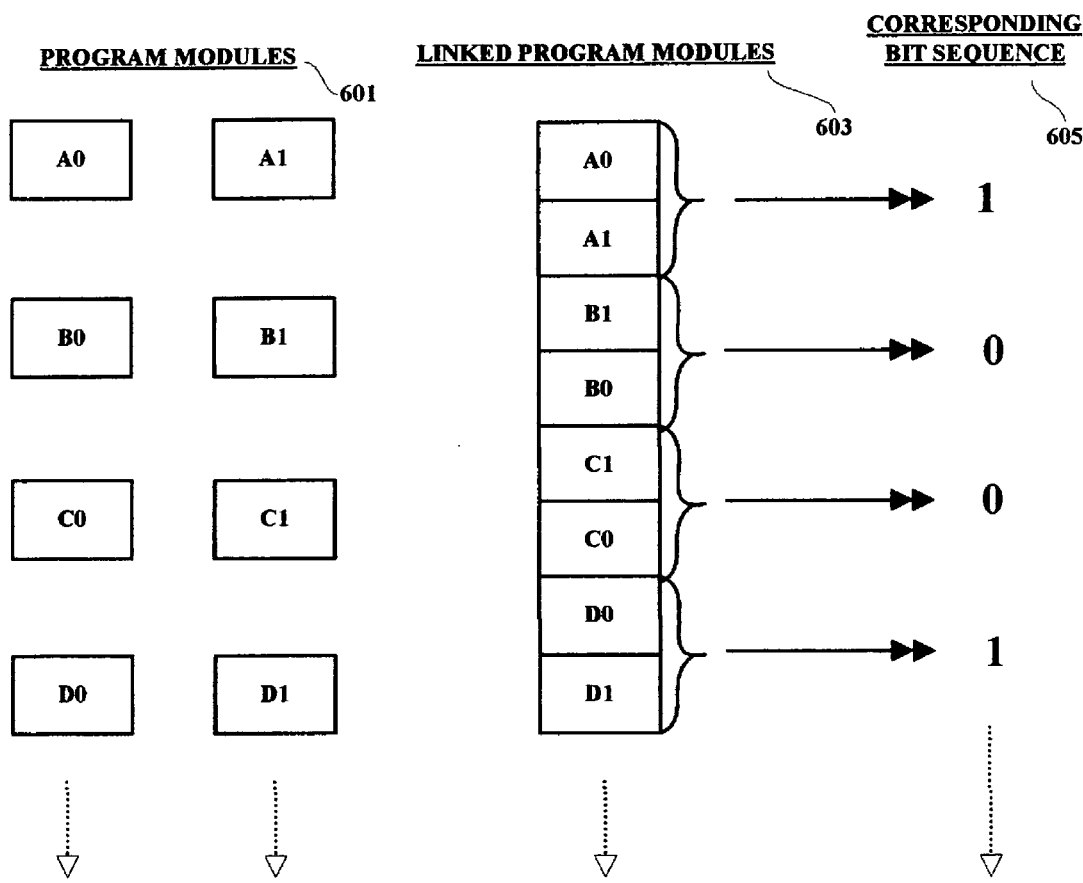
FIG. 6 is illustration of an exemplary encoding methodology by which program modules may be arranged to correspond to selected related licensed program information.

For example, as shown in FIG. 6, program modules 601 are first designated in sets of two, such as "A0" and "A1", and "B0" and "B1", etc. Next, with reference to the bit sequence 605 of the bit stream which includes the transaction information, the program modules are linked 603 or sequenced in an order to reflect the corresponding bit being encoded. In the example, if module "A0" is sequenced before module "A1" then that linked structure represents a logical "1" for the first bit position. Similarly, if module "B1" is sequenced before module "B0", then that linked structure represents a logical "0" for the next bit position. In this manner, the entire bit sequence of selected transaction information can be encoded into the structure or organization of a licensed program without requiring or using a separate bit field for the encoded information.

To retrieve the transaction information, a number of different methods can be used. For example, a CRC (cyclic redundancy check) can be performed on the program which can be set to be different for all serial numbers. Then the CRC can be looked-up in the original website transaction database to identify the original customer. Another method for retrieving the encoded transaction information would be to select characteristic strings of bytes or bits sufficient to distinguish how the modules were ordered at various points in the executable module in order to recover the original serial number and other transaction information. The strings would be chosen to be sufficient in identifying the order of the modules in encoding the information. If pairs of modules are used as above, just one bit differing in each pair of modules is sufficient. If other encodings are used (other than the pair encoding described above), then longer strings may be required in order to identify each module in a more complex reordering.

Figure 7:
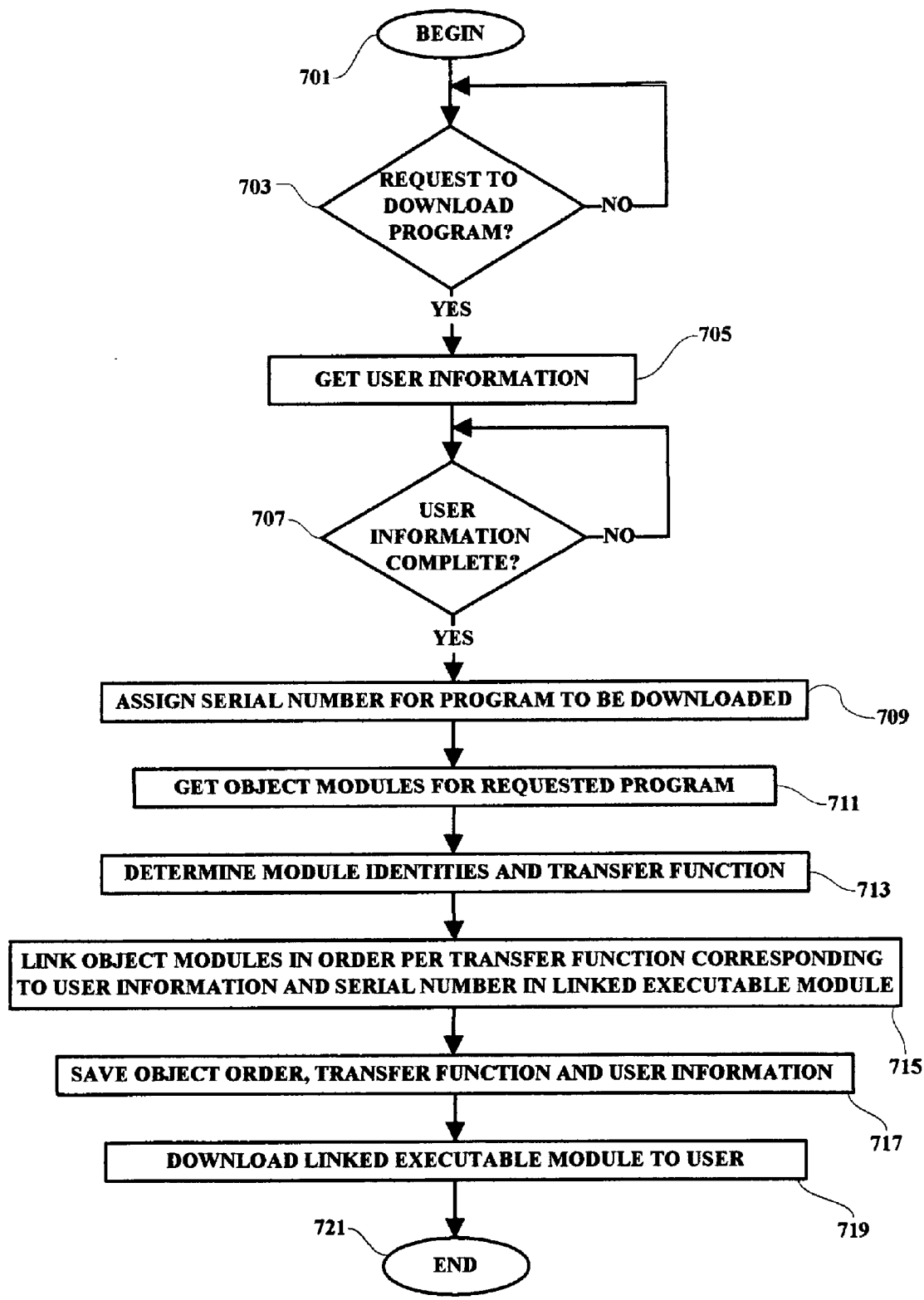
FIG. 7 is a flowchart illustrating an exemplary operational sequence in embedding user information into a licensed program structure and downloading an executable licensed program to a licensed user.

As shown in the flowchart of FIG. 7, the methodology begins 701 when a request is received at a website to license and download a program 703. The website server then requests certain user information 705 regarding the transaction which may include the user's name or other identification. When the user information is complete 707, a serial number is assigned 709 to the program to be downloaded and the object modules for the licensed program are assembled 711. Next, the program modules are identified and an appropriate transfer function is acquired 713. In the present example, the sets of modules are identified as "A0" and "A1", "B0" and "B1" etc. The transfer function in the example is a simple sequence of linking such as "A0" before "A1" represents a logic "1" and a "A1" before "A0" represents a logic "0". Next, the object modules are linked 715 into a linked executable module in an order according to the transfer function to correspond to the transaction information bit sequence (user information and serial number) of the licensed transaction. The transaction, and other information including object order or sequence and transfer function, are then saved 717. The linked executable module is then downloaded to the user 719 and the process ends 721.

Figure 8:
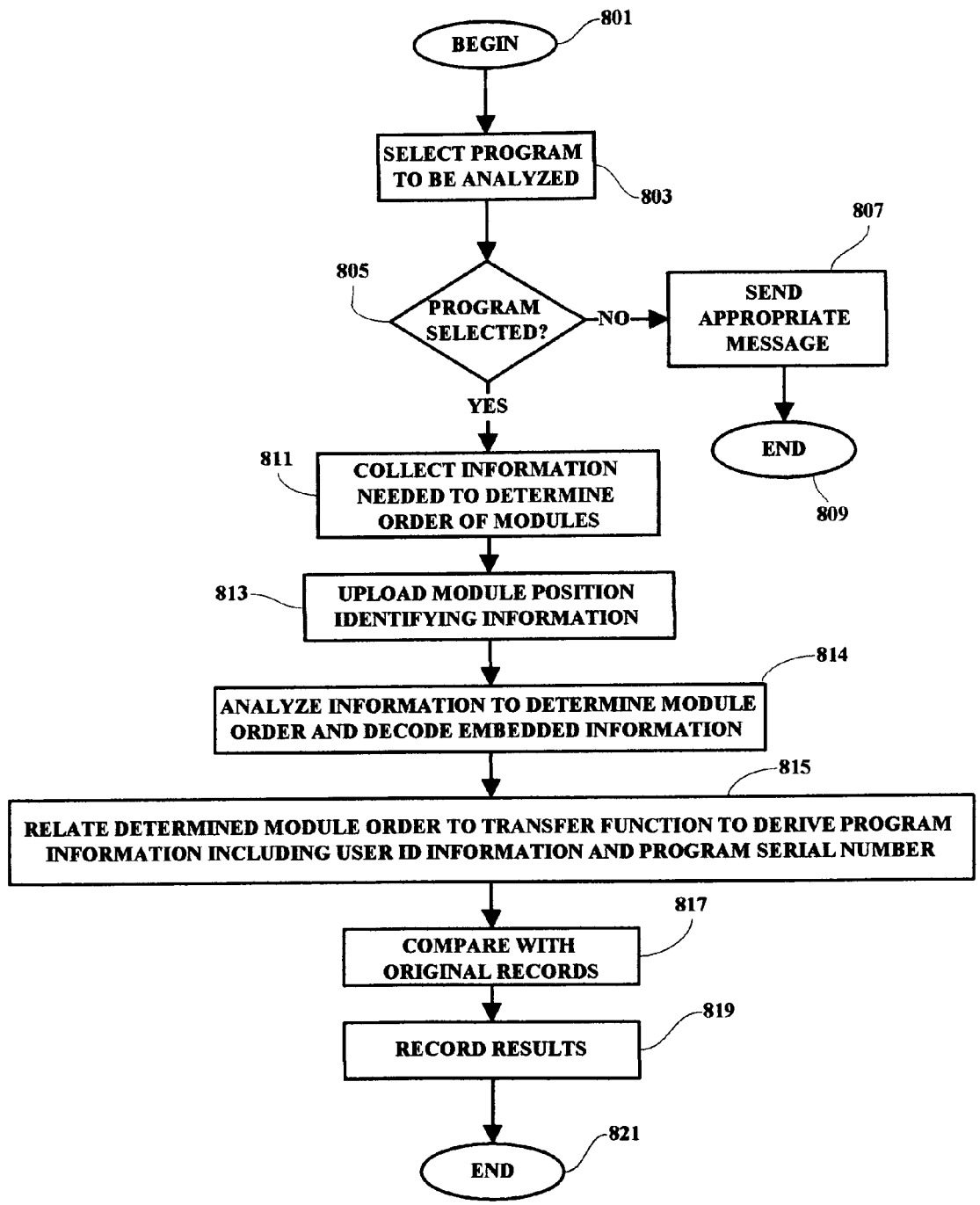
FIG. 8 is a flowchart illustrating an exemplary methodology in extracting the structurally-embedded information from a program and determining the authenticity of a program being analyzed.

As shown in FIG. 8, an exemplary method for extracting the encoded transaction information begins 801 by selecting a program to be analyzed. The execution of the validating process shown in FIG. 8 may be initiated in many ways. For example, the process may be initiated automatically when a user logs-on to the original website for an upgrade to a program previously downloaded from the website. In this manner, unauthorized copies can be determined automatically and upgrades can be limited to only licensed users. In another application, the validation process may be initiated on a machine-by-machine basis as part of a larger site validation check. If the program to be validated is not found on the user machine 805, then an appropriate message is sent 807 to the validating entity and the process ends 809. If the program to be analyzed is found 805, in user storage for example, then information needed to determine the order of modules is collected 811. This could include a selection of bits or bytes or bit/byte strings from the software package as well as one or more CRC check values for the entire package. After that information is collected, it is uploaded to the validating site 813, such as the original licensing website or an independent validating site, where the collected information is analyzed to determine module order and decoded to extract the embedded information 814. The module order is used 815 to derive program information including user ID information and program serial number in the example. The developed transaction information is then compared with the original records 817 stored at the website, and the results of the comparison are recorded 819 as the processing ends 821.

Figure 9:
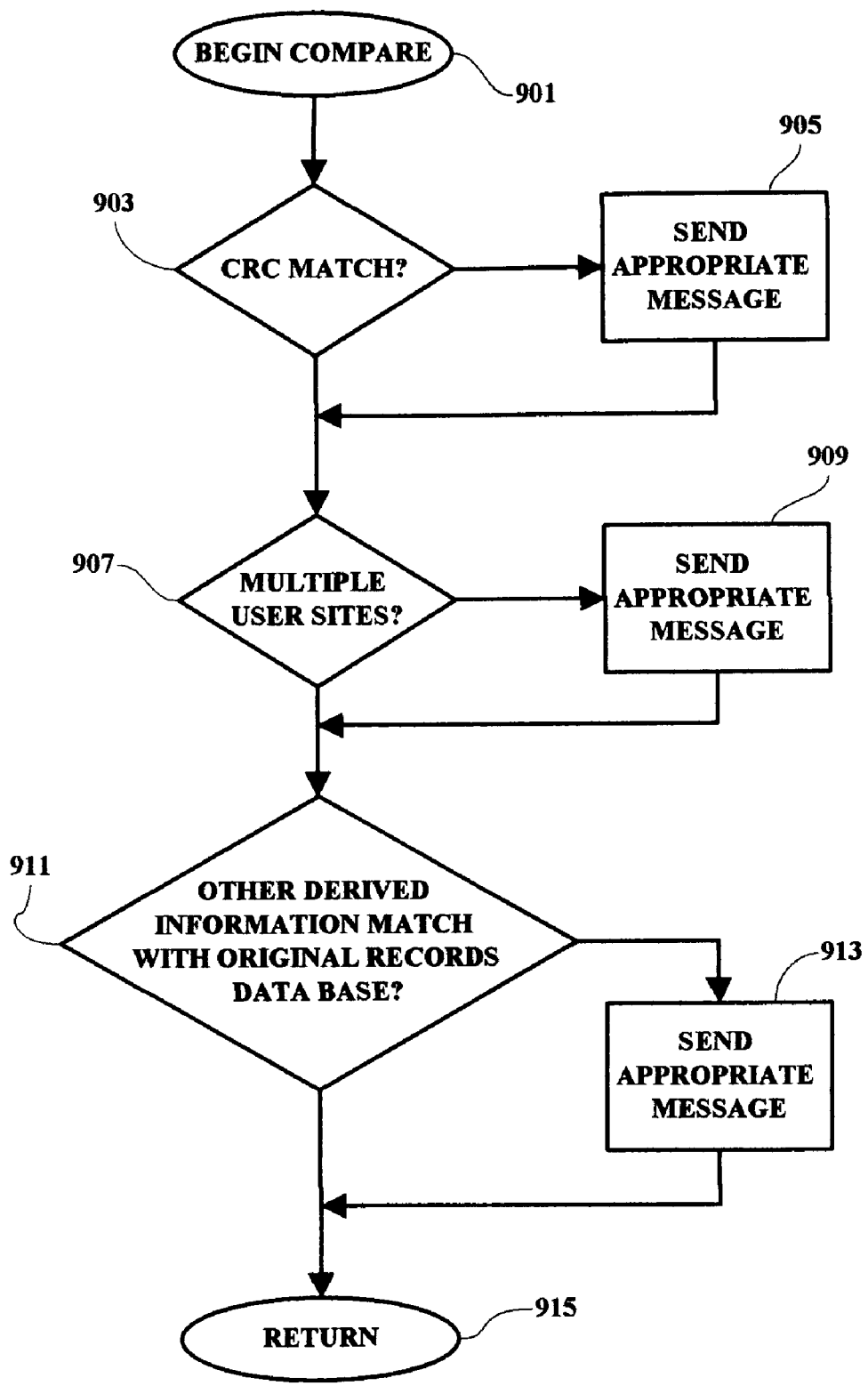
FIG. 9 is a flowchart illustrating an exemplary embodiment of the COMPARE function shown in FIG. 8.

The "compare" function 817 shown in FIG. 8 is illustrated in more detail in FIG. 9. As shown, the compare function begins 901 by determining if there is a CRC match 903. If there is no CRC match 903, then an appropriate message is sent 905 for printout or display. Next, a check is made 907 to determine if there have been multiple user sites 905 for the software package being analyzed. If the program had been licensed for only one site but the extracted information shows that multiple sites have been identified, then an appropriate message is sent 909. Next, further checks are made 911 to determine if other information derived from the software package being analyzed matches with the information contained in the original records of the software provider 911. If not, then appropriate messages are sent to the analyzing agency 913 and the processing returns 915 to record the results of the comparison (819 of FIG. 8).

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A medium including machine readable coded indicia, said machine readable coded indicia being selectively operable in combination with a processing circuit for extracting embedded identification information from a software package by determining an organization of executable software modules within said software package, said organization comprising a sequence in which components of said executable software modules are linked, wherein relationships between said executable software modules are representative of said identification information embedded within said software package, wherein said executable software modules are organized in a series of sets of executable software modules, said series of sets corresponding to a binary series, and each of said sets comprises first and second executable software modules, said binary series being determined in accordance with a sequence of said first and second executable software modules within said sets of said executable software modules.

2. The medium as set forth in claim 1 wherein said medium is an optically encoded disk.

3. The medium as set forth in claim 1 wherein said medium is a magnetically encoded magnetic diskette.

4. The medium as set forth in claim 1 wherein said software package resides on a storage device within a computer device.

5. The medium as set forth in claim 1 wherein software package resides on a memory device within a computer device.

6. The medium as set forth in claim 1 wherein said embedded identification information includes an identification of a user of said software package.

7. The medium as set forth in claim 1 wherein said embedded identification information includes an identifying number related to said software package.

8. The medium as set forth in claim 7 wherein said embedded identification information further includes an identification of a user of said software package.

9. A network arranged to enable extracting of organizational information of an organization of executable software modules within a software package at a user terminal and transferring said organizational information to a server for use in deriving identification information embedded within said organizational information, said network comprising:
    a user terminal at which said software package resides;
    a server; and
    an interconnection between said server and said user terminal, said user terminal being responsive to a request to upload said organizational information of said software package for determining said organizational information and transferring said organizational information to said server, said organizational information comprising a sequence in which components of said executable software modules are linked, wherein said executable software modules are organized in a series of sets of executable software modules, said series of sets corresponding to a binary series, and each of said sets comprises first and second executable software modules, said binary series being determined in accordance with a sequence of said first and second executable software modules within said sets of said executable software modules.

\* \* \* \* \*